United States Patent
Walker et al.

(10) Patent No.: US 10,218,543 B2
(45) Date of Patent: Feb. 26, 2019

(54) SUBSCRIBER STATION FOR A BUS SYSTEM AND METHOD FOR REDUCING WIRE-BOUND EMISSIONS IN A BUS SYSTEM

(71) Applicant: Robert Bosch GmbH, Stuttgart (DE)

(72) Inventors: Steffen Walker, Reutlingen (DE); Axel Pannwitz, Radebeul (DE)

(73) Assignee: ROBERT BOSCH GMBH, Stuttgart (DE)

(*) Notice: Subject to any disclaimer, the term of this patent is extended or adjusted under 35 U.S.C. 154(b) by 337 days.

(21) Appl. No.: 15/034,456

(22) PCT Filed: Oct. 20, 2014

(86) PCT No.: PCT/EP2014/072416
§ 371 (c)(1),
(2) Date: May 4, 2016

(87) PCT Pub. No.: WO2015/067460
PCT Pub. Date: May 14, 2015

(65) Prior Publication Data
US 2016/0285653 A1     Sep. 29, 2016

(30) Foreign Application Priority Data

Nov. 8, 2013  (DE) .................. 10 2013 222 782

(51) Int. Cl.
*H04L 25/02*        (2006.01)
*H04L 12/40*        (2006.01)

(52) U.S. Cl.
CPC ......... *H04L 25/0274* (2013.01); *H04L 12/40* (2013.01); *H04L 2012/40215* (2013.01)

(58) Field of Classification Search
CPC ............................ H04L 25/02; H04L 12/40; H04L 2012/40215
See application file for complete search history.

(56) References Cited

U.S. PATENT DOCUMENTS

| | | | |
|---|---|---|---|
| 6,975,261 B1 * | 12/2005 | Isham | H03M 1/068 341/144 |
| 7,868,809 B2 * | 1/2011 | Iadanza | H03M 1/06 341/144 |

(Continued)

FOREIGN PATENT DOCUMENTS

| | | |
|---|---|---|
| CN | 1589547 A | 3/2005 |
| CN | 102170302 A | 8/2011 |

(Continued)

OTHER PUBLICATIONS

International Search Report dated Jan. 29, 2015 of the corresponding International Application No. PCT/EP2014/072416.

(Continued)

*Primary Examiner* — Henry Tsai
*Assistant Examiner* — Christopher A Daley
(74) *Attorney, Agent, or Firm* — Norton Rose Fulbright US LLP; Gerard Messina

(57) ABSTRACT

A subscriber station for a bus system and a method for reducing wire-bound emissions in a bus system are provided. The subscriber station includes a digital-analog converter for converting a digital signal into an analog signal, and an analog-digital converter, the digital-analog converter and the analog-digital converter being connected for a balancing of the dominant bus state of the bus system.

17 Claims, 2 Drawing Sheets

(56) References Cited

U.S. PATENT DOCUMENTS

| | | | | |
|---|---|---|---|---|
| 8,203,822 B2* | 6/2012 | Hemon | ............... | B60R 21/017 361/247 |
| 8,401,174 B1* | 3/2013 | Whitehouse | ........... | H04M 1/24 379/394 |
| 8,878,711 B1* | 11/2014 | Loeda Pagliano | ...... | H03M 3/37 341/118 |
| 9,495,317 B2* | 11/2016 | Metzner | .............. | G06F 13/4022 |
| 2004/0075463 A1* | 4/2004 | Cranford, Jr. | ...... | H03K 19/0005 326/30 |
| 2004/0124905 A1 | 7/2004 | Haase et al. | | |
| 2008/0285682 A1* | 11/2008 | Chu | ..................... | H04L 27/364 375/298 |
| 2009/0040089 A1* | 2/2009 | Dosho | ................. | H03M 1/1215 341/161 |
| 2010/0201399 A1* | 8/2010 | Metzner | .................. | H04B 3/06 326/83 |
| 2016/0283435 A1* | 9/2016 | Walker | ................ | H04L 25/0274 |

FOREIGN PATENT DOCUMENTS

| | | |
|---|---|---|
| CN | 102193890 | 9/2011 |
| DE | 10250576 | 5/2004 |
| EP | 1376962 | 1/2004 |
| RU | 2338262 C2 | 5/2008 |
| WO | 9217017 A1 | 10/1992 |
| WO | 9957810 A2 | 11/1999 |
| WO | WO 2006/133731 | 12/2006 |

OTHER PUBLICATIONS

Florian Hartwich, "CAN with Flexible Data Rate, White Paper, Version 1.0," published May 2, 2011, accessed at http://www.semiconductors.bosch.de.

* cited by examiner

SUBSCRIBER STATION FOR A BUS SYSTEM AND METHOD FOR REDUCING WIRE-BOUND EMISSIONS IN A BUS SYSTEM

FIELD

The present invention relates to a subscriber station for a bus system and to a method for reducing wire-bound emissions in a bus system, in which a symmetrization of the dominant bus state is achieved.

BACKGROUND INFORMATION

The CAN bus is a differential bus system having high demands on signal symmetrization. In this context, the better the signal symmetrization, the lower the radio-frequency interference radiation and the interference at radio-frequency receivers, such as for example a car radio, GPS, radiotelephone, etc. The opposite-phase signals CAN_H and CAN_L should be controlled in such a way that their mean value deviates as little as possible from center voltage VCC5/2=2.5V.

Currently, the signal symmetrization is achieved in that the resistances of the switches to ground GND and to the potential VCC5 are balanced in such a way that, in the dominant bus state, or dominant state of the bus, in which the difference voltage of the signals CAN_H-CAN_L has a value of approximately 2V, the mean value voltage is 2.5V. The balancing of the switch resistances takes place for example through suitable dimensioning or via regulating circuits described, for example, in German Patent Application No. DE 10250576 A1.

However, it is problematic that, on the one hand, until now no on-chip balancing of the symmetry has been capable of being carried out. On the other hand, currently optimal symmetrization is not possible under conditions of aging and temperature drift. In addition, a significant reduction of the radiated interference is to be achieved.

SUMMARY

An object of the present invention is to provide a subscriber station for a bus system, and a method, that may solve the problems named above. In particular, a subscriber station for a bus system and a method are provided according to which a significant reduction of the radiated interference is possible, and demands made on the symmetrization of the bus signal are met even given aging and temperature drift.

The object may be achieved by a subscriber station for a bus system in accordance with an example embodiment of the present invention. The subscriber station includes a digital-analog converter, for converting a digital signal into an analog signal, and an analog-digital converter, the digital-analog converter and the analog-digital converter being wired together for a balancing of the dominant bus state of the bus system.

With the subscriber station, it is possible to symmetrize the dominant bus state. In this way, current errors in different signal paths that can occur due to component mismatches can be avoided.

In addition, with the subscriber station, it is possible to realize an on-chip balancing of the symmetrization, and a balancing during the final test is also possible.

A further advantage of the subscriber station is that an optimal symmetrization is possible even under conditions of aging and temperature drift.

In the subscriber station, it is possible for the digital-analog converter to be fashioned for the cyclical execution and/or for the on-chip execution of the balancing.

The subscriber station can in addition have a volatile memory in which a control word of the digital-analog converter for carrying out the balancing is stored.

In addition, the subscriber station can have a switch for separating the digital-analog converter and the analog-digital converter from a bus of the bus system in order to carry out the balancing. Here, the switch can include a PMOS-HV cascode and an NMOS-HV cascode, which can be switched high-ohmic for the execution of the balancing in order to separate the digital-analog converter and the analog-digital converter from a bus of the bus system.

Moreover, it is possible for the subscriber station to include a short-circuit path from an NV-NMOS transistor to an NV-PMOS transistor in order to start a digital control loop for the balancing.

The above-described subscriber station can be part of a bus system that has a bus and has at least two subscriber stations that are connected to one another via the bus in such a way that they are capable of communicating with one another, at least one of the at least two subscriber stations being one of the subscriber stations described above.

In addition, the object may be achieved by a method for reducing wire-bound emissions in a bus system in accordance with an example embodiment of the present invention. In the example method, in a subscriber station of the bus system there are provided a digital-analog converter, for converting a digital signal into an analog signal, and an analog-digital converter, the digital-analog converter and the analog-digital converter being wired to one another in such a way that the digital-analog converter and the analog-digital converter carry out a balancing of the dominant bus state of the bus system.

The method offers the same advantages as those named above with reference to the subscriber station.

In the method, the balancing can be executed cyclically and/or as on-chip balancing.

In addition or alternatively, in order to carry out the balancing in the method it is possible to use a control word of the digital-analog converter that is stored in a volatile register.

In addition, for carrying out the balancing, a PMOS-HV cascode and an NMOS-HV cascode can be switched high-ohmic in order to separate the digital-analog converter and the analog-digital converter from a bus of the bus system. In this way, for the balancing it is possible, with a short-circuit path from a current-determining element at the side of an output current mirror CAN_H to a current-determining element at the side of an output current mirror CAN_L, to start a digital control loop in which the current of the current-determining element at the side of output current mirror CAN_H and the current of the current-determining element at the side of output current mirror CAN_L can be regulated to an approximately equal value.

Further possible implementations of the present invention also include combinations not explicitly named of features or specific embodiments described above or below with reference to the exemplary embodiment. In this context, a person skilled in the art will also add individual aspects as improvements or supplements to the respective basic form of the present invention.

BRIEF DESCRIPTION OF THE DRAWINGS

Below, the present invention is described in more detail with reference to the accompanying figures, and on the basis of an exemplary embodiment.

In the figures, identical or functionally identical elements have been provided with the same reference characters, unless otherwise indicated.

DETAILED DESCRIPTION OF EXAMPLE EMBODIMENTS

Figure 1:
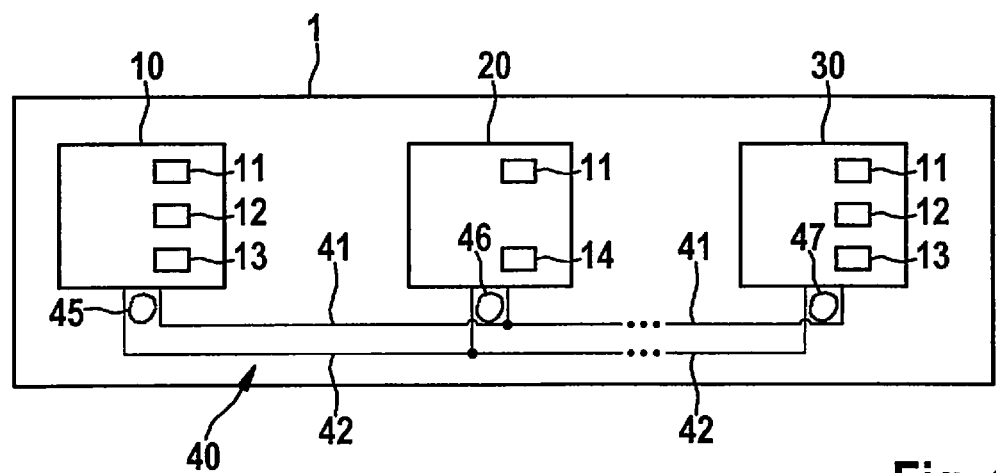
FIG. 1 shows a simplified schematic diagram of a bus system according to an exemplary embodiment.

FIG. 1 shows a bus system 1, which can be for example a CAN bus system, a CAN-FD bus system, etc. Bus system 1 can be used in a vehicle, in particular a motor vehicle, an airplane, etc., or in a hospital, etc.

In FIG. 1, bus system 1 has a multiplicity of subscriber stations 10, 20, 30, each connected to a bus 40 having a first bus lead 41 and a second bus lead 42. Bus leads 41, 42 can also be designated CAN_H and CAN_L, and are used to couple in the dominant level in the transmit state. Via bus 40, messages 45, 46, 47 can be transmitted between the individual subscriber stations 10, 20, 30 in the form of signals. Subscriber stations 10, 20, 30 can for example be control devices or display devices of a motor vehicle.

As shown in FIG. 1, subscriber stations 10, 30 each have a communication control device 11, a transmit device 12, and a receive device 13. In contrast, subscriber station 20 has a communication control device 11 and a transceiver device 14. Transmit devices 12, receive devices 13 of subscriber stations 10, 30, and transceiver device 14 of subscriber stations 20 are each connected directly to bus 40, even though this is not shown in FIG. 1.

Communication control device 11 is used to control a communication of the respective subscriber station 10, 20, 30, via bus 40, with another subscriber station of subscriber stations 10, 20, 30 connected to bus 40.

Transmit device 12 is used to send messages 45, 47 in the form of signals and for the reduction of wire-bound emissions in bus system 1, in order to fulfill the requirements of bus system 1 with regard to signal balancing, as is described in more detail below. Wire-bound emissions can occur on bus 40. Communication control device 11 can be realized as a conventional CAN controller. Receive device 13 can be realized as a conventional CAN transceiver, with regard to its receive functionality. Transceiver device 14 can be realized as a conventional CAN transceiver.

Figure 2:
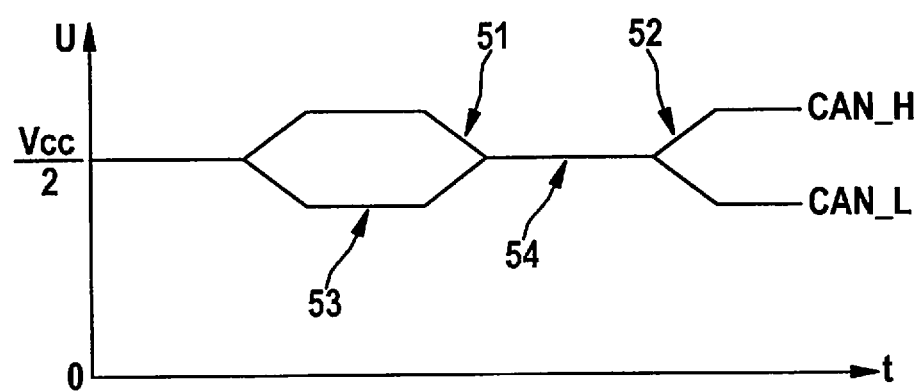
FIG. 2 shows a target voltage curve of a bus signal over time in the bus system according to the exemplary embodiment.
Figure 3:
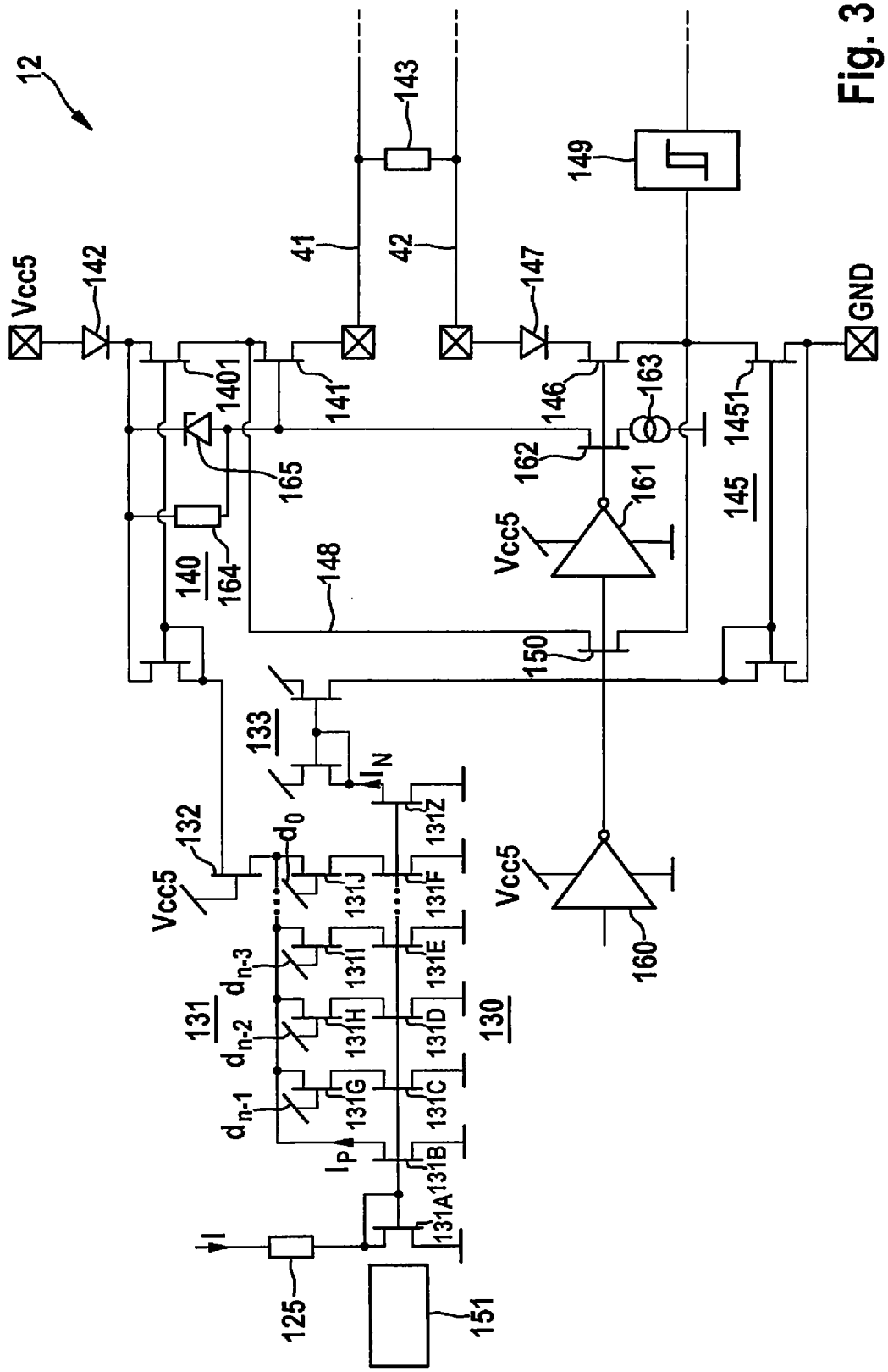
FIG. 3 shows an electrical schematic diagram of a transmission device of a subscriber station of the bus system according to the exemplary embodiment.

FIG. 2 shows a voltage curve U plotted over time t with switching edges 51, 52, as produced by transmit device 12, which is shown in more detail in FIG. 3. Switching edge 51 corresponds to a transition of the signal from the dominant state 53 to the recessive state 54. Switching edge 52 corresponds to a transition of the signal from the recessive state 54 to the dominant state 53. The depicted voltage curve has switching edges 51, 52 of a target voltage curve to be produced by transmit device 12. Dominant state 53 corresponds to a dominant bus state. Recessive state 54 corresponds to a recessive bus state.

According to FIG. 3, transmit device 12 includes a current bank 130, into which an input signal, or input current I, is fed, via a resistor 125, by a PMOS transistor (not shown), an output current mirror CAN_H 140, which conducts the current to bus lead 41 (CAN_H), and an output current mirror CAN_L 145, which conducts the current to bus lead 42 (CAN_L).

Current bank 130 includes a current mirror 131, formed from NMOS transistors 131A, 131B and a digital-analog converter, of which, in FIG. 3, transistors 131C, 131D, 131E, 131F, 131G, 131H, 131I, 131J are shown as a specific example. In fact, current mirror 131 has n transistors 131C, 131D, 131E, 131F in the digital-analog converter, and n transistors as a switch, where n is a natural number greater than 1. Thus, in the example of FIG. 3 n=4. In addition, current bank 130 has an NMOS high-voltage cascode 132, also referred to below as NMOS-HV cascode 132, and a PMOS current mirror 133 for low voltage. NMOS-HV cascode 132 is connected to output current mirror 140. PMOS current mirror 133 is connected to output current mirror 145.

Transistors 131C, 131D, 131E, 131F, 131G, 131H, 131I1, 131J form a current digital-analog converter having word width n. To each current source output formed by transistors 131C, 131D, 131E, 131F with binary weighting there is connected in series one of the transistors 131G, 131H, 131I1, 131J as switching transistor 131, controlled by the respective data bit $d_{n-1}$, $d_{n-2}$, $d_{n-3}$ through $d_0$.

Because the input signal or input current I is fed into current bank 130 by the PMOS transistor (not shown), resistance 125 is not connected to a fixed potential. NMOS transistor 131B, next to the input of current bank 130, supplies the base current $I_P$ for the PMOS side of current bank 130. Here, base current $I_P$ is the typical current minus one half (½) of a balancing current, ½ of the balancing current flowing into the path of transistors 131C, 131G, ¼ of the balancing current flowing into the path of transistors 131D, 131H, ⅛ of the balancing current flowing into the path of transistors 131E, 131I, etc., and $½^n$ of the balancing current flowing into the path of transistors 131F, 131J, which is the nth transistor path. Here, the highest-value partial current is ½ of the balancing range. The highest-value partial current is controlled using data bit $d_{n-1}$. Data bit $d_{n-1}$ is the most significant bit (MSB). Next to it at right in FIG. 3 is the second-highest-value partial current, having ¼ of the balancing range. This partial current is controlled using data bit At far right, there is the lowest-value partial current, having the value ($½^n$) (one divided by 2 raised to the n power). The lowest-value partial current is controlled by data bit $d_0$. Data bit 0 is the least significant bit (LSB). At far right in current bank 130 in FIG. 3, a transistor 131Z is provided that feeds the current $I_N$ for the N side into current mirror 133.

Output current mirror CAN_H 140 is a PMOS current mirror for low voltage for CAN_H output current production. Output current mirror CAN_L 145 is an NMOS current mirror for low voltage for CAN_L output current production. Current mirrors 140, 145 are formed with MOS low-voltage transistors that are identical in their layout, in order to obtain identical signal delays, as well as identical saturation behavior, in the CAN_H and CAN_L branch of the circuit shown in FIG. 3.

In FIG. 3, a PMOS high-voltage cascode, also referred to below as PMOS-HV cascode 141, is connected to output current mirror CAN_H 140. PMOS-HV cascode 141 is required for an error case "short-circuit of CAN_H to −27 V." In addition, a polarity reversal protection diode 142, for protecting the circuit against positive overvoltage from CAN_H, is connected to output current mirror CAN_H 140.

In addition, in FIG. 3, an NMOS high-voltage cascode 146, also referred to below as NMOS-HV cascode 146, is connected to output current mirror CAN_L 145. NMOS-HV cascode 146 is required for an error case "short circuit CAN_L to −27 V." In addition, a polarity reversal protection diode 147 is connected to output current mirror CAN_L 145. Polarity reversal protection diode 147 is required in the error case "short-circuit CAN_L to 40 V." Between PMOS-HV cascode 141 and polarity reversal protection diode 147, bus 40 is connected with bus leads 41, 42, which are terminated by resistance 143. Thus, resistance 143 has the same resistance as the wave resistance of bus 40, for which reason no reflections occur at bus 40. Here, bus lead 41 stands for the transmission of the signal CAN_H and bus lead 42 stands for the transmission of signal CAN_L. Reference character 148 designates a short-circuit path. NMOS-HV cascode 146 is connected to an analog-digital converter 149. Analog-digital converter 149 can be a comparator that is a 1-bit converter. Analog-digital converter 149 is adjacent to a transistor 1451 at the output of current mirror 145 and to a switching transistor 150 that is fashioned as a MOSFET and that forms short-circuit path 148. Through the short-circuiting of two current sources, transistors 1401 and 1451, a configuration having high sensitivity is obtained. Even the smallest differences in current cause the potential at the input of analog-digital converter 149 to be switched to 0 V or to the voltage/potential VCC5. In most cases, a simple comparator is adequate as analog-digital converter 149 to perform this functionality. Reference character 151 designates a volatile memory.

The circuit described above is greatly simplified with regard to resistance 143. At each line end of bus leads 41, 42 there are present two 60Ω resistances, connected in series, for termination. The respective midpoint is set at 2.5 V.

In FIG. 3, an inverter 161 is provided for the controlling of the gate of the NMOS-HV cascode 146. Thus, either cascodes 146/141 or switching transistor 150 are switched low-ohmic in order to switch short-circuit path 148. Inverter 161 is additionally provided to control the gate of an NMOS-HV cascode 162 that is connected to a current source 163. Current source 163 emits its current to the PMOS side. This current flows into a zener diode 165 and a resistance 164. Zener diode 165 determines the negative gate potential for HV-PMOS cascode 141. Resistance 164 ensures that when current source 163 is switched off, cascode 141 is switched off. In addition, an inverter 160 is provided for controlling switching transistor 150. However, inverter 160 can also be a buffer.

In transmit device 12 shown in FIG. 3, in a method for reducing wire-bound emissions in bus system 1 a balancing is carried out as follows. For the balancing, a switch is provided including the transistors PMOS-HV cascode 141, NMOS-HV cascode 146, and switching transistor 150, which separates the current paths from the terminals CAN_L or CAN_H, and produces a short-circuit between the two current-determining elements. In the present exemplary embodiment, the two current-determining elements are current sources, namely transistors 1401 and 1451. Thus, for the balancing the transistors PMOS-HV cascode 141 and NMOS-HV cascode 146 are switched high-ohmic, and the short-circuit path 148 is switched on from low-voltage PMOS transistor 1401 of current mirror 140, which transistor 1401 is referred to below as NV-PMOS transistor, to low-voltage NMOS transistor 1451 of current mirror 145, which transistor 1451 is referred to below as NV-NMOS transistor. There now starts a digital control loop that for example alters the nominal current of NV-PMOS transistor 1401 from small to large. At the beginning, the current of NV-NMOS transistor 1451, which current can also be called the NMOS current, will dominate, because the current of NV-PMOS transistor 1401, which current can also be referred to as the PMOS current, is small. In this way, the input of analog-digital converter 149 is drawn to ground GND. As the PMOS current increases, the input of analog-digital converter 149 is suddenly drawn to a higher voltage value. At this point, the PMOS current is greater than the NMOS current. With adequately small current steps of digital-analog converter 133, it can be brought about that the P- and NMOS current are approximately equal. The control word of digital-analog converter 130, which can also be referred to as the DAC control word, is stored in volatile memory 151, in particular a register, and is used during each normal transmit process of transmit device 12. The balancing is carried out cyclically by the digital part or digital-analog converter 130, e.g. after each wake-up of transmit device 12 from the low-power state (power-down state).

Thus, with transmit device 12 of FIG. 3, a method is carried out for reducing wire-bound emissions in bus system 1. Here, transmit device 12 carries out a balancing for the symmetrization of the dominant bus state, as described above.

The required voltage strength is achieved by cascode stages and a switching transistor 150. The cascode stages are formed from MOS high-voltage transistors, namely cascodes 141, 146, 132.

As can be seen in FIG. 3, in transmit device 12 the above-described circuit for symmetrization of the dominant bus state is largely separated from bus 40, represented by bus leads 41, 42 and resistance 143. This advantage is achieved through the cascode transistors, namely cascodes 141, 146. In this way, radiated interference, such as that due to DPI, BCI, etc., is kept away from sensitive blocks such as digital-analog converter 130.

Thus, the present invention uses the division of the CAN driver transistors into low-voltage signal transistor and high-voltage cascode transistor. When CAN transmit device 12 is in recessive operation, in which the driver transistors are switched off, it is then possible to carry out an on-chip balancing of the symmetry of the dominant bus state. Alternatively, however, it is also possible to use the method described above as a built-in self-test during a final test of CAN transmit device 12, in particular as a one-time balancing during the final test, and to store the ascertained trim values fixedly in an OTP register for later use, in particular to burn them there.

All embodiments described above of bus system 1, of subscriber stations 10, 30, of transmit device 12, and of the method can be used individually or in all possible combinations. In particular, any combination is possible of the features of the exemplary embodiment. In addition, in particular the following modifications are possible.

Bus system 1 according to the exemplary embodiment is in particular a CAN network or a CAN FD network or a FlexRay network.

The number and configuration of subscriber stations 10, 20, 30 in bus system 1 is arbitrary. In particular, it is also possible for only subscriber stations 10 or only subscriber stations 30 or only subscriber stations 10, 30 to be present in bus system 1 of the exemplary embodiments.

Subscriber stations 10, 30 described above, and the method executed by them, can be used particularly advantageously with a modified data protocol, which was published on 2 May 2011 at the Internet page http://www.semiconductors.bosch.de in the published document CAN with Flexible Data Rate, White Paper, Version 1.0," and which enables, inter alia, an enlargement of the data field, as well as a shortening of the bit length for a part of the CAN message after arbitration has taken place.

The switch described above, which separates the current paths from the terminals CAN_L or CAN_H and which produces a short-circuit between the two current-determining elements, can also be formed by one or more additional switching elements that realize the named function instead of PMOS-HV cascode 141 and NMOS-HV cascode 146. The switch can have any design suitable for this purpose.

Subscriber stations 10, 30 represent, particularly for CAN-FD, a possibility for increasing the transmit quality of CAN-FD in the range of standard CAN transmissions, using a significantly higher data rate.

The functionality of the exemplary embodiment described above can also be realized in a transceiver 13 or in a communication control device 11, etc. In addition or alternatively, transmit device 12 can be integrated into existing products.

What is claimed is:

1. A subscriber station for a bus system, comprising:
   a terminal connection to a first bus line of the bus system;
   a terminal connection to a second bus line of the bus system;
   a digital-analog converter for converting a digital signal into an analog signal; and
   an analog-digital converter connected to the digital-analog converter, wherein the subscriber station is configured to:
      output data onto the bus system by controlling the first and second bus lines to be at different electrical levels in a dominant bus state of the bus system; and
      control the connected analog-digital converter and digital-analog converter to balance the different electrical levels to which the first and second bus lines are set in the dominant bus state of the bus system to be symmetrical about a predefined electrical level.

2. The subscriber station as recited in claim 1, wherein the digital-analog converter is fashioned for at least one of: i) cyclical execution of the balancing, and ii) on-chip execution of the balancing.

3. The subscriber station as recited in claim 1, further comprising:
   a volatile memory in which a control word of the digital-analog converter for carrying out the balancing is stored.

4. The subscriber station as recited in claim 1, further comprising:
   a switch for separating the digital-analog converter and the analog-digital converter from a bus of the bus system to carry out the balancing.

5. The subscriber station as recited in claim 4, wherein the switch includes a PMOS-HV cascode and an NMOS-HV cascode, which can be switched high-ohmic in order to carry out the balancing, to separate the digital-analog converter and the analog-digital converter from the bus of the bus system.

6. The subscriber station as recited in claim 5, further comprising:
   a short-circuit path from an NV-NMOS transistor to an NV-PMOS transistor for starting a digital control loop for the balancing.

7. The subscriber station as recited in claim 1, wherein the first and second bus lines of the bus system are set to a same electrical level in a recessive state in which data is not being transmitted on the bus system.

8. The subscriber station as recited in claim 1, further comprising:
   a high voltage cascode transistor connected to an output of the digital-analog converter;
   a low voltage output current mirror that is connected to an output current of the high voltage cascode transistor, is configured to conduct the output current to the first bus line, and includes a transistor at its output; and
   a high voltage cascode transistor that is connected to:
      the transistor at the output of the low voltage output current mirror; and
      the terminal connection to the first bus line.

9. The subscriber station as recited in claim 8, further comprising:
   a volatile memory in which a control word of the digital-analog converter for carrying out the balancing is stored, wherein:
      the digital-analog converter includes:
         as a binary-weight current source output, a number of first transistors, the number corresponding to a word width of the control word; and
         in series with each of the first transistors, a respective second transistor as a switch; and
      the first transistors are connected to a current path to one of the terminal connections and the second transistors are connected to a current path to the other of the terminal connections.

10. The subscriber station as recited in claim 8, wherein the high voltage cascode transistor is an NMOS high voltage cascode in a current path to the terminal connection to the first bus line.

11. The subscriber station as recited in claim 8, wherein the digital-to-analog converter is connected to a current path to the terminal connection to the first bus line and to a current path to the terminal connection to the second bus line.

12. The subscriber station as recited in claim 11, further comprising a PMOS current mirror via which the digital-analog converter is connected to the current path to the terminal connection to the second bus line.

13. A bus system, comprising:
   a bus including a first bus line and a second bus line; and
   at least two subscriber stations connected to one another via the bus in such a way that the subscriber stations can communicate with one another, wherein at least one of the at least two subscriber stations:
      includes:
         i) a digital-analog converter for converting a digital signal into an analog signal; and
         ii) an analog-digital converter connected to the digital-analog converter; and
      is configured to:
         output data onto the bus by controlling the first and second bus lines to be at different electrical levels in a dominant bus state of the bus system; and
         control the connected analog-digital converter and digital-analog converter to balance the different electrical levels to which the first and second bus lines are set in the dominant bus state of the bus system to be symmetrical about a predefined electrical level.

14. A method for reducing wire-bound emissions in a bus system that includes a first bus line and a second bus line, wherein data is transmittable over the bus system by setting the first and second bus lines to different electrical levels in a dominant state of the bus system, the method comprising:

controlling a digital-analog converter for converting a digital signal into an analog signal and an analog-digital converter in a subscriber station of the bus system, which are connected to each other, to balance the different electrical levels to which the first and second bus lines are set in the dominant bus state of the bus system to be symmetrical about a predefined electrical level.

15. The method as recited in claim 14, wherein at least one of: i) the execution of the balancing is carried out at least one of cyclically and as on-chip balancing, and ii) for the carrying out of the balancing, a control word of the digital-analog converter is used that is stored in a volatile memory.

16. The method as recited in claim 14, wherein a PMOS-HV cascode and an NMOS-HP cascode are switched high-ohmic to separate the digital-analog converter and the analog-digital converter from a bus of the bus system for the carrying out of the balancing, in order to start, with a short-circuit path from a first a current-determining element at a side of an output current mirror to a second current-determining element at a side of an output current mirror, a digital control loop in which current of the first current-determining element and second current of the current-determining element is controlled to an approximately equal value, for the balancing.

17. A subscriber station for a bus system that includes a first bus line and a second bus line, the subscriber station comprising:

a digital-analog converter for converting a digital signal into an analog signal;

a high voltage cascode transistor connected to an output of the digital-analog converter;

a low voltage output current mirror that is connected to an output current of the high voltage cascode transistor, is configured to conduct the output current to the first bus line, and includes a transistor at its output;

a high voltage cascode transistor that is connected to:
  the transistor at the output of the low voltage output current mirror; and
  a terminal connection to the first bus line; and an analog-digital converter connected to the digital-analog converter, wherein the subscriber station is configured to control the connected analog-digital converter and digital-analog converter to balance a dominant bus state of the bus system.

* * * * *